Aug. 13, 1935.　　　R. W. GILBERT　　　2,011,315
POTENTIOMETRIC INDICATOR
Filed Dec. 15, 1933　　　2 Sheets-Sheet 1

INVENTOR
R. W. GILBERT
BY
ATTORNEYS

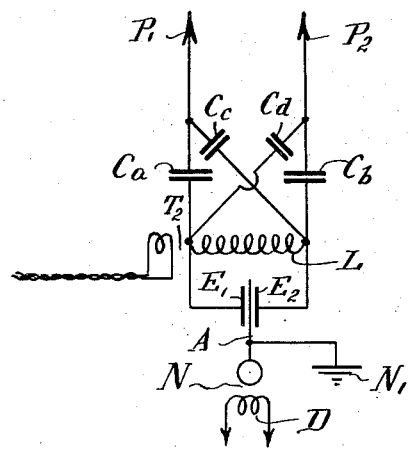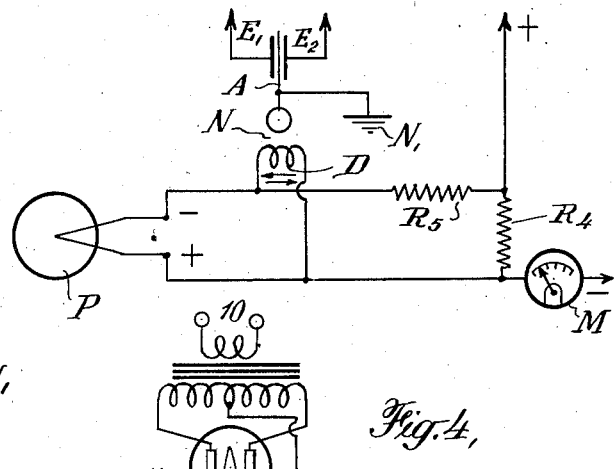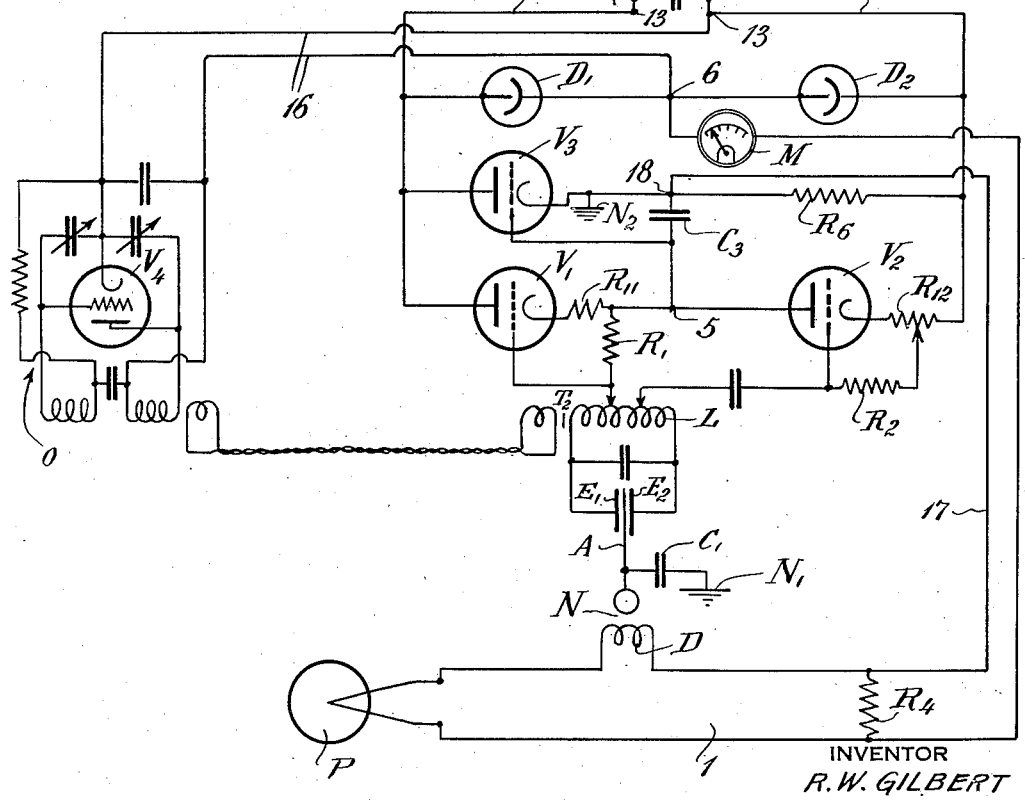

Patented Aug. 13, 1935

2,011,315

UNITED STATES PATENT OFFICE 2,011,315

POTENTIOMETRIC INDICATOR

Roswell Ward Gilbert, Neshanic, N. J.

Application December 15, 1933, Serial No. 702,540

12 Claims. (Cl. 175—183)

This invention relates to automatic potentiometric balancing and indicating apparatus adapted more particularly to the measurement of small voltage or current changes.

In one of its modifications the invention finds utility in recording pyrometry, for measuring voltage changes of thermo-couples, photoelectric cells, and the like, exposed to temperature, or radiant energy changes.

The invention also finds utility for determining variations of electrolytic conditions of industrial solutions, particularly in the determination of pH values of solutions, wherein it is desirable to measure accurately and automatically, small voltage variations potentiometrically.

In another of its modifications the invention finds utility in the measurement of no load or open circuit voltages of small magnitude, particularly where the internal resistance of the source is variable, as in the case of thermo-couples, etc.

The device is likewise adaptable to the measurement of current without adding any IR drop to the circuit to be measured. This is desired in some cases such as for use with the voltaic type of photoelectric cell.

It is generally conceded that the measurement of small potentials, such as are encountered in pH determination cells, and thermo-couples, is best accomplished through the medium of a potentiometric balance. This method, by substantially preventing current flow in the cell or couple, eliminates sources of error which might result from the presence in the circuit of resistance, or from changes of resistance in the circuit.

Instruments now in use for the automatic measurement of small voltages by potentiometric means, such as recording pyrometers, resort to intricate mechanical devices that are expensive and require extreme care. Recording pyrometry and instruments for recording pH values of electrolytic solutions would undoubtedly be more extensively used in the industries were a simple and rugged, yet accurate, device available in place of the present complicated structures.

It is the purpose of this invention to provide such a device, employing but a single mechanically movable element of simple and rugged construction, and no contacting elements, for the automatic maintenance of a potentiometric balance; and the amplifying action of an electronic device to provide a relatively heavy operating current varying in direct proportionality with potential or current changes of the source under observation, for the operation of an indicating or recording apparatus.

In accordance with the invention, the source to be measured is arranged in parallel with a fixed resistance traversed by space current supplied from an electronic tube. This parallel arrangement constitutes a balancing circuit wherein, in the operation of the system, the space current traversing the fixed resistance, is automatically so varied in conformity with voltage or current fluctuations of the source as to maintain at all times a condition of electrical equilibrium in the balancing circuit.

The mechanism assuring the maintenance of this electrical equilibrium in the balancing circuit, employs an electrical bridge having as adjacent balancing arms the space paths, respectively, of a pair of grid-controlled space discharge devices arranged to operate as detectors, and as a conjugate arm the input or grid circuit to the electronic tube, space current of which traverses the fixed resistance in the balancing circuit, as described.

The detector grids derive input potentials from a high-frequency source applied to a tuned circuit to which the detector grids are tapped. Arranged in shunt to the tuned circuit is a differential capacity comprising spaced condenser plates between which the polarized armature of a galvanometer or the like, is deflected in response to a flow of unbalance current in its associated actuating coil, the latter being connected in series in or in shunt to the balancing circuit, depending on whether voltage or current measurements are desired.

This armature is effectively grounded at high frequency, as are likewise the cathodes of each of the detector tubes. In consequence of this, a fixed voltage applied between the detector grids is apportioned between the detector inputs, in the ratio of the distances from the armature to the condenser stator plates respectively. Thus as the armature is deflected in either direction from its median position, the input potential applied to one detector increases, while that applied to the other detector decreases, with the result that the space path resistance of the detectors vary with movements of the armature. The arrangement is such that the resulting readjustment of the bridge circuit provides a correcting grid bias applied to the tube in the conjugate arm which varies the space current of this tube in such manner as automatically to compensate for and thus eliminate in the balancing circuit, a flow of unbalance current resulting from fortuitous fluctuations of the source.

Since each fluctuation of the source is reflected in magnified form as a change in space current of the electronic tube located in the conjugate bridge arm, such fluctuations may be conveniently indicated or recorded on a suitable device traversed by the space current of this tube.

In the drawings:

Fig. 2 is a modified detail of the Fig. 1 circuit wherein a capacitive voltage divider is utilized for applying high frequency voltage to the detector grids in place of the inductive arrangement of Fig. 1.

Fig. 3 is a modified detail of the Fig. 1 circuit illustrating an adaptation to the measurement of small currents, in contrast to voltage indications.

Fig. 4 shows the Fig. 1 circuit, as modified to utilize a single electrical energizing source for the entire system.

Like elements are similarly designated in the several figures.

Figure 1:
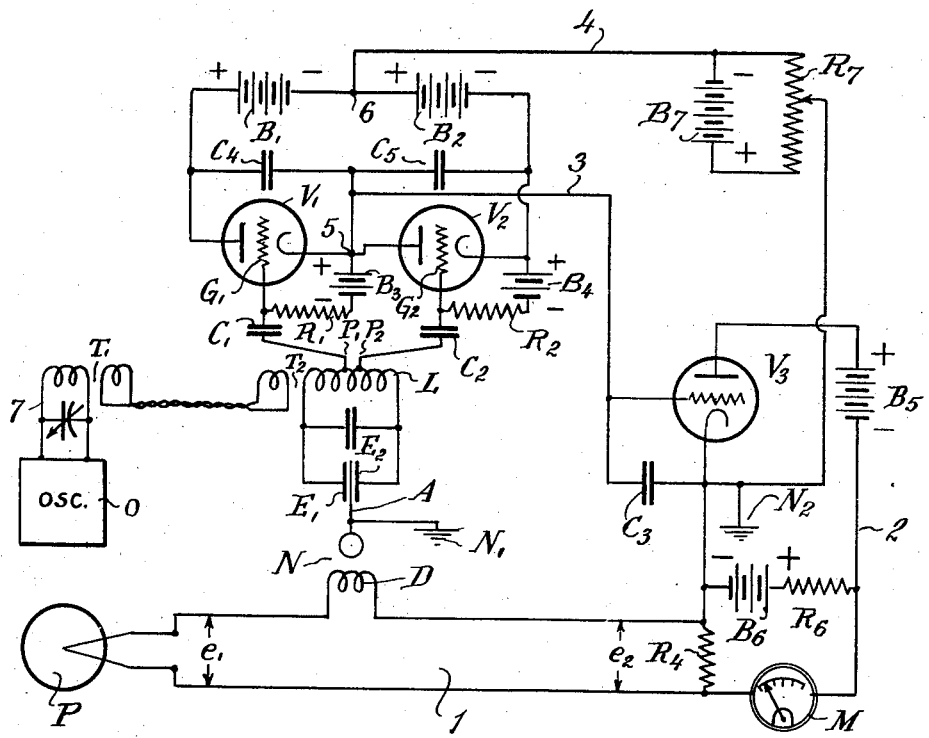
Fig. 1 shows diagrammatically a circuit in accordance with this invention adapted to voltage indication. The circuit is simplified, for purposes of delineating the principle of operation, by employment of a plurality of batteries instead of the preferred single energizing source.

Referring to Fig. 1, the voltage source P, photocell, thermo-couple, etc., to be measured, is connected in parallel in balancing circuit I, with a resistance $R_4$, traversed by space current of an electronic tube $V_3$. To this end a connection 2 extends from the anode of tube $V_3$ through an energizing source $B_5$ and resistance $R_4$, to the cathode.

A condenser $C_3$ is connected between grid and cathode electrodes of tube $V_3$, for controlling by its charge the grid bias applied to the tube. The condenser $C_3$ is connected by conductors 3 and 4 between conjugate points 5 and 6 of an electrical bridge, the balancing arms of which comprise in series connection, batteries $B_1$ and $B_2$, of constant voltage, and the space or cathode-anode paths of a pair of grid-controlled space discharge devices $V_1$ and $V_2$, here shown as electronic tubes.

Tubes $V_1$ and $V_2$ are adapted, by means of the by-pass condensers $C_4$ and $C_5$ to operate as detectors, the grids of which may, if desired, be permanently biased by inclusion of suitable potential sources, such as batteries $B_3$ and $B_4$.

The detector grids $G_1$ and $G_2$ tapped at $P_1$ and $P_2$, to a coil L, derive input potentials from a high-frequency oscillator O, the tuned output of which is coupled to coil L of the tuned circuit through transformers $T_1$ and $T_2$, connected by twisted leads.

The balancing circuit I contains the actuating coil D of a galvanometer N or the like, for deflecting a pivotally mounted polarized armature A between spaced condenser electrodes $E_1$ and $E_2$. Armature A is grounded at $N_1$, and the cathodes of the detector tubes $V_1$ and $V_2$ are, at high frequency, effectively grounded at $N_2$, by way of conductors 3 and 4. In consequence, the constant high-frequency potential applied by portion $P_1$, $P_2$ of coil L, between the grids $G_1$ and $G_2$ of the detector tubes, is apportioned between the input circuits of the respective detectors in the ratio of the distances of armature A from electrodes $E_1$ and $E_2$, respectively.

For indicating changes in the space current of tube $V_3$, and hence on a magnified scale, variations in the voltage of source P, a meter or recorder M may be inserted in the anode circuit of tube $V_3$. A compensating shunt around resistance $R_4$ and device M is provided by resistance $R_6$ in series with battery $B_6$, the latter being so poled as to tend to cause a current flow through resistance $R_4$ opposite to that provided by battery $B_5$. This permits of adjusting the flow of space current in resistance $R_4$ to the order of magnitude required for potentiometric balance against source P; while at the same time maintaining the operation of tube $V_3$ on the most linear portion of its grid voltage—plate current characteristic, as determined by its space battery $B_5$, and grid biasing potential provided by battery $B_7$ and potentiometer $R_7$. This grid biasing potential is applied to the grid of tube $V_3$ over conductors 3, 4 and through the space path of tube $V_2$. This shunt $B_6$, $R_6$ also permits of obtaining a positive zero reading on device M, in that it may cause an actual reversal of current flow in resistance $R_4$.

In the operation of the system, with armature A positioned midway of electrodes $E_1$ and $E_2$ the space current flowing through resistance $R_4$ is adjusted to provide a potential drop $e_2$ equal and opposite to the voltage $e_1$ of source P, so that no current flows in the actuating coil D. Also, with armature A midway of electrodes $E_1$ and $E_2$, equal biasing potentials will be applied by oscillator O to the grid of tubes $V_1$ and $V_2$, so that their space path resistances will be equal and the bridge will be balanced, that is, the conjugate points 5 and 6 will be at the same potential.

Now cause the voltage $e_1$ of source P to decrease, as by decreasing the temperature or radiant energy delivered thereto, or in the case of pH determination, by a change in hydrogen ion concentration. The resulting voltage difference $e_2-e_1$, will cause an unbalance current to flow through actuating coil D, thereby deflecting the armature A toward the left. This will decrease the input potential applied to detector $V_1$, and increase the input potential applied to detector $V_2$, so that the space path resistance of these tubes will change in opposite directions, that is, the space path resistance of tube $V_1$ will increase while that of tube $V_2$ will decrease.

Inasmuch as the space current for tubes $V_1$ and $V_2$ must always be equal, due to their connection in series, the voltage drop across tube $V_2$ must decrease, and that across tube $V_1$ must increase, causing the potential of the conjugate point 5 to become more negative with respect to conjugate point 6. A displacement current thus flows through conductors 3 and 4 in the conjugate arm to charge condenser $C_3$, thereby increasing the negative biasing potential applied to the grid of tube $V_3$. This decreases the space current of tube $V_3$ until the voltage $e_2$, due to the flow of space current through resistance $R_4$, equals the new voltage $e_1$ of source P, whereupon the flow of unbalance current through the actuating coil D, ceases. In effecting this change, the armature A is displaced but an extremely small distance from its median position, and when the apparatus is again in potentiometric balance, the armature A does not return to its median position, but remains in its new and correct position to maintain the balance.

Now cause the voltage $e_1$ of source P to increase until it appreciably exceeds the drop $e_2$ across $R_4$. The resulting potential difference $e_1-e_2$ causes an unbalance current of opposite sense to that first considered, to flow through the actuating coil D, in consequence of which the armature A deflects toward the right electrode or stator plate $E_2$. This causes, in a manner analogous to that explained, decrease of input potential applied to detector tube $V_2$, and an increase of input potential applied to detector tube $V_1$, with the result that the space path resistance of the former increases, while that of the latter decreases. The bridge is thus unbalanced in such manner that the potential of the conjugate point 5 increases in a positive sense, with respect to conjugate point 6, thereby to decrease the charge on condenser $C_3$. The resulting decrease of bias applied to the grid of tube $V_3$, increases its space current until the voltage drop $e_2$ across resistance $R_4$ once more balances the new voltage $e_1$ of source P, whereupon the flow of unbalance current through actuating coil D, ceases.

The automatic maintenance of a balance between voltages $e_1$ and $e_2$, in the manner described, depends in no way upon the grid voltage-plate current characteristics of any of tubes $V_1$ to $V_3$, although it is of advantage to have the detector tube characteristics similar, and initially operating with respect to identical points on their characteristic curves.

For the condition of balance, there exists at all times the relation that the ratio of the voltage $e_1$ of source P, to the resistance $R_4$, is proportional to the space current of tube $V_3$, as measured by the meter or record device M. This direct proportionality between the relatively large anode current of tube $V_3$, and the relatively small voltage $e_1$ of source P, permits the use of measuring or recording device M of rugged construction.

The galvanometer D is readily constructed to have a high sensitivity and still be rugged and serviceable.

The voltage and current indicating apparatus described herein is entirely free from mechanical contacts, thereby avoiding any difficulties which may arise in sensitive relay switches, due to cohesion or adhesion of contacting surfaces, which otherwise would cause the contacts to stick or adhere to one another. It is to be understood in this connection that in the operation of this system, the armature A never makes contact with either of the spaced electrodes $E_1$ and $E_2$.

The high frequency grounding at $N_1$ of the armature A establishes for all deflections of armature A, a potential node on coil L located between the detector grid tapping points $P_1$ and $P_2$. Thus as the tapping points $P_1$ and $P_2$ are moved closer to each other, the sensitivity of the device increases by reason of an increase in percentage change of biasing potentials applied to the detector grids for a given deflection of armature A. If, however, the tapping points $P_1$ and $P_2$ are located too close to one another the apparatus is apt to become unstable. The optimum adjustment is easily obtainable in practice by observation of the performance.

The adaptation of Fig. 2 for applying high frequency potential to the detector grids, is essentially an off balance bridge consisting of the four capacities $C_a$, $C_b$, $C_c$ and $C_d$, and inductance L, forming a tuned circuit. When $C_a$ is equal to $C_b$ and $C_c$ to $C_d$, and $C_a$ and $C_b$ are larger or smaller than $C_c$ and $C_d$, a small shift in the position of the potential node caused by a movement of armature A produces a large differential in high frequency voltage applied to the detector input.

Fig. 3 shows an adaptation whereby the device is enabled to measure current without introducing resistance or load into the circuit being measured. This is of advantage in many cases, for example, in measuring the no-load or short circuited output current of a voltaic photocell. It consists in placing in series with one of the conductors of the balanced circuit 1, a resistance $R_5$, and arranging the actuating coil D in shunt to source P. For this condition the voltage of source P must be poled series aiding with the voltage across resistance $R_4$. The circuit adjusts itself for balance with no current flowing in coil D, which is equivalent to short circuiting the output of source P. The current being measured is therefore equal to the current through the resistance $R_5$, which is equal to the current measured at M multiplied by the ratio $$\frac{R_4}{R_4+R_5}$$

In the circuit of Fig. 4, alternating current is applied to input terminals 10 of a full wave rectifier 11 and associated output low pass filter 12 to provide at output terminals 13 a constant source of uni-directional voltage for energizing the entire indicating device.

The voltage at terminals 13 is applied over conductors 14 and 15 to conjugate points of the bridge circuit, the balancing arms of which comprise as before, a pair of detector tubes $V_1$ and $V_2$, and a pair of gaseous or glow discharge tubes $D_1$ and $D_2$. The space paths of the tubes are series connected in pairs with their cathodes toward the negative side of source 13 and their anodes toward the positive side.

The electronic tube $V_3$, which controls the balancing circuit 1, has its space or anode-cathode path connected in series with a resistance $R_6$ between the conjugate points of the bridge joined to conductors 14 and 15. The grid circuit of tube $V_3$ is, however, arranged in the other conjugate arm of the bridge, traced from conjugate point 6 through meter M and balancing resistance $R_4$, thence through the grid biasing condenser $C_3$ bridged between grid and cathode of tube $V_3$, to conjugate point 5. Tube $V_4$ of the oscillator O is energized over conductors 16 by the voltage drop across the glow discharge tube $D_2$.

Tubes $D_1$ and $D_2$ of the gaseous or glow discharge type, such as neon tubes, are characterized in that when the glow discharge is established, the voltage drop across each tube is practically independent of the magnitude of current flow in the space discharge path. These tubes therefore, arranged as shown, are the equivalent to sources of constant voltages, such as the batteries $B_1$ and $B_2$ of Fig. 1, in consequence of which the potential of conjugate point 6 remains constantly at half that of the positive terminal 13 with respect to its negative terminal, and this despite unbalancing of the bridge.

Due to the fact that the path 17 containing meter M and the balancing resistance $R_4$ is bridged from point 6, between tubes $D_1$ and $D_2$, to point 18, between resistance $R_6$ and the space path of tube $V_3$, the voltage drop across tube $D_2$ tends to establish through $R_6$ and in path 17 a current flow of opposite polarity to that produced in path 17 by the space current of tube $V_3$. This is equivalent to the differential arrangement provided by the path $B_6$, $R_6$ of Fig. 1, whereby tube $V_3$ is caused to operate on the most desirable portion of its grid voltage-plate current characteristic while providing a suitable current flow in resistance $R_4$ to effect the potentiometric balance.

In Fig. 4, the blocking condenser $C_1$ for detector tube $V_1$ is located in the ground lead of armature A. The detector tubes may be permanently biased for most sensitive detection by the inclusion of resistances $R_{11}$ and $R_{12}$ in their respective cathode leads. The grid of tube $V_2$ is potentiometrically tapped to resistance $R_{12}$ as a means of adjusting tube $V_2$ to operate with respect to the same portion of its characteristic as does tube $V_1$.

Since operation of the Fig. 4 circuit is fundamentally that described for the Fig. 1 circuit, no detailed explanation of the Fig. 4 operation is required.

I claim:

1. Device responsive to a small voltage source comprising, a bridge having as adjacent balancing arms the space paths, respectively, of a pair of space discharge devices, and as a conjugate arm the grid circuit of a space discharge device having an anode, a cathode, and a grid electrode, a balancing circuit traversed by the space current of said device last mentioned, said circuit comprising a resistance shunting said small voltage source, high-frequency means controlling the space path resistances of said discharge devices, means responsive to a flow of unbalanced current in said circuit for oppositely varying said balancing arm space path resistances, automatically to maintain a condition of electrical equilibrium in said balancing circuit, and translating means indicative of the condition of equilibrium.

2. Device responsive to a small voltage source comprising, a bridge having as adjacent balancing arms the space paths, respectively, of a first and a second space discharge device, and as a conjugate arm the grid circuit of a third space discharge device having an anode, a cathode, and a control grid, a balancing circuit traversed by the space current of said third device, said circuit comprising a resistance in shunt to said small voltage source, high-frequency means controlling the space path resistances of said first and second devices, means responsive to unbalanced current flow in said balancing circuit for oppositely varying the space path resistances of said first and second devices, automatically to maintain in said balancing circuit a condition of electrical equilibrium, and translating means responsive to space current of said third space discharge device.

3. Device responsive to a small voltage source comprising, a bridge having as adjacent balancing arms the space paths, respectively, of a pair of grid-controlled detectors, and as a conjugate arm the grid circuit of an electronic tube having an anode, cathode and a grid electrode, a balancing circuit traversed by space current of said tube comprising a resistance in parallel with said small voltage source, high-frequency means for applying potentials to the control grids of said detectors, means responsive to unbalanced current flow in said balancing circuit for oppositely varying the potentials applied to said detector grids, thereby automatically to maintain a condition of electrical equilibrium in said circuit, and translating means responsive to space current of said electronic tube.

4. Device responsive to a small voltage source comprising, a bridge having as adjacent balancing arms the space paths, respectively, of a pair of grid-controlled detectors, and as a conjugate arm the grid circuit of an electronic tube having an anode, a cathode and a grid electrode, a circuit traversed by space current of said tube comprising a resistance in parallel with said small voltage source, the voltage of which opposes the voltage across said resistance, high-frequency means for applying potentials to the control grids of said detectors, means including the actuating coil of a deflectable armature, in series with said small voltage source for oppositely varying the high-frequency generated potentials applied to said detector grids in response to current flow in said coil, automatically to maintain a condition of potential equilibrium in said balancing circuit, and translating means responsive to space current of said electronic tube.

5. Device responsive to small current changes comprising, a bridge having as adjacent balancing arms the space paths, respectively, of a pair of grid-controlled detectors, and as a conjugate arm, the grid circuit of an electronic tube having anode, cathode, and grid electrodes, a balancing circuit traversed by the space current of said tube comprising a resistance in parallel with a source subject to electrical variation, the voltage of which aids the voltage across said resistance in said circuit, high-frequency means for applying potentials to said detector grids, means including the actuating coil of a deflectable armature, shunting the resistance in said circuit for oppositely varying the high-frequency generated potentials applied to said detectors automatically to maintain the current in said actuating coil substantially zero, and a translating device responsive to space current of said tube.

6. Device for measuring small currents and voltages comprising, a bridge having as adjacent balancing arms the space paths, respectively, of a pair of grid-controlled detectors, and as a conjugate arm the grid circuit of an electronic tube, having anode, cathode and grid electrodes, a balancing circuit traversed by space current of said tube including a resistance shunting a polarized electrical source to be measured, high-frequency means normally applying equal potentials to said detector grids, means responsive to unbalanced current flow in said balancing circuit for oppositely varying the potentials applied to said detector grids automatically to restore a balance in said circuit, and a translating device responsive to space current of said electronic tube.

7. Device for measuring small currents and voltages comprising, a bridge having as adjacent balancing arms the space paths, respectively, of a pair of grid-controlled detectors, and as a conjugate arm the grid circuit of an electronic tube, having anode, cathode, and grid electrodes, a balancing circuit traversed by space current of said electronic tube, including a resistance shunting a polarized electrical source to be measured, high-frequency means normally applying equal potentials to said detector grids, means including an electrode displaceable, in response to unbalanced current flow in said balancing circuit, between spaced condenser plates for oppositely varying the potentials applied to said detector grids, automatically to restore a balance in said circuit, and a translating device responsive to space current of said electronic tube.

8. Device for measuring small currents and voltages comprising, a bridge having as adjacent balancing arms the space paths, respectively, of a pair of grid-controlled detectors, and as a conjugate arm the grid circuit of an electronic tube having anode, cathode and grid electrodes, a balancing circuit traversed by space current of said electronic tube, including a resistance shunting a polarized electrical source to be measured, high-frequency means for applying potentials to said detector grids, means including a polarized armature displaceable, in response to unbalanced current flow in said balancing circuit, between spaced capacity electrodes to vary oppositely the potentials applied to said detector grids automatically to maintain a condition of electrical equilibrium in said circuit, and a translating device responsive to space current of said electronic device.

9. Device responsive to small currents and voltages comprising, a bridge having as adjacent balancing arms the space paths, respectively, of a pair of grid-controlled detectors, and as a conjugate arm a condenser controlling by its charge the grid potential of an electronic tube having anode, cathode and grid electrodes, a balancing circuit traversed by space current of said electronic tube, said circuit containing resistance shunting a polarized voltage source, high-frequency means for applying potentials to said detector grids, means automatically maintaining a condition of electrical equilibrium in said circuit, in response to current flow therein by oppositely varying the potentials applied to said detector grids, and a translating device responsive to space current of said electronic tube.

10. Device responsive to small currents and voltages comprising, a bridge having as adjacent balancing arms the space paths, respectively, of a pair of grid-controlled detectors, and as a conjugate arm a condenser controlling by its charge the grid potential of an electronic tube having anode, cathode and grid electrodes, means responsive to the space current of said tube including an indicating device and a circuit containing resistance shunting a polarized voltage source, high-frequency means for applying potentials to said detector grids, said means including a polarized armature displaceable between spaced electrodes, in response to current flow in said circuit, to vary oppositely the potentials applied to said detector grids automatically to maintain a condition of electrical equilibrium in said circuit.

11. Device responsive to small currents and voltages comprising, a bridge having as adjacent balancing arms the space paths, respectively, of a pair of grid-controlled detectors, and as a conjugate arm a condenser controlling by its charge the grid potential of an electronic tube having anode, cathode and grid electrodes, means responsive to the space current of said tube including an indicating device and a circuit containing resistance shunting a polarized voltage source, high-frequency means for applying potentials to said detector grids, said means including a polarized armature displaceable, in response to current flow in said circuit, between spaced condenser electrodes but not contacting therewith, to vary oppositely the potentials applied to said detector grids automatically to maintain a condition of electrical equilibrium in said circuit.

12. Device responsive to small currents and voltages comprising, a bridge having as adjacent balancing arms the space paths, respectively, of a pair of grid-controlled detectors, each having anode, cathode and grid electrodes, and as a conjugate arm a condenser controlling by its charge the grid potential of an electronic tube having anode, cathode and grid electrodes, means responsive to the space current of said tube including an indicating device and a circuit containing resistance shunting a polarized voltage source, a tuned circuit shunted by a condenser comprising spaced electrodes, means applying high-frequency potential to said potentiometer, taps from said tuned circuit individual to the detector grids for applying potentials thereto, a polarized armature displaceable, in response to current changes in said circuit, between but not contacting with said spaced condenser electrodes, and means effectively connecting said armature to the detector cathodes, whereby the detector grid input potentials are varied oppositely with displacement of said armature automatically to maintain a condition of electrical equilibrium in said circuit.

ROSWELL WARD GILBERT.